(12) United States Patent
Hurewitz

(10) Patent No.: US 7,689,490 B2
(45) Date of Patent: Mar. 30, 2010

(54) MATCHING RESOURCES OF A SECURITIES RESEARCH DEPARTMENT TO ACCOUNTS OF THE DEPARTMENT

(75) Inventor: Barry Scott Hurewitz, New York, NY (US)

(73) Assignee: Morgan Stanley, New York, NY (US)

( * ) Notice: Subject to any disclaimer, the term of this patent is extended or adjusted under 35 U.S.C. 154(b) by 1414 days.

(21) Appl. No.: 10/857,400

(22) Filed: May 28, 2004

(65) Prior Publication Data

US 2005/0267824 A1    Dec. 1, 2005

(51) Int. Cl.
*G06Q 40/00* (2006.01)
(52) U.S. Cl. .................................................. 705/36 R
(58) Field of Classification Search .................. 705/36, 705/36 R
See application file for complete search history.

(56) References Cited

U.S. PATENT DOCUMENTS

| | | | |
|---|---|---|---|
| 4,710,763 A | 12/1987 | Franke et al. | |
| 5,128,860 A | 7/1992 | Chapman | |
| 5,502,637 A | 3/1996 | Beaulieu et al. | |
| 5,630,070 A | 5/1997 | Dietrich et al. | |
| 5,822,410 A | 10/1998 | McCausland et al. | |
| 5,864,853 A | 1/1999 | Kimura et al. | |
| 5,913,201 A | 6/1999 | Kocur | |
| 5,940,843 A | 8/1999 | Xucknovich et al. | |
| 5,963,911 A * | 10/1999 | Walker et al. | 705/7 |
| 5,968,121 A | 10/1999 | Logan et al. | |
| 6,029,146 A | 2/2000 | Hawkins et al. | |
| 6,049,599 A | 4/2000 | McCausland et al. | |
| 6,292,830 B1 | 9/2001 | Taylor et al. | |
| 6,324,523 B1 | 11/2001 | Killeen, Jr. et al. | |
| 6,330,545 B1 | 12/2001 | Suh | |
| 6,374,227 B1 * | 4/2002 | Ye | 705/8 |
| 6,381,744 B2 | 4/2002 | Nanos et al. | |
| 6,415,269 B1 | 7/2002 | Dinwoodie | |
| 6,470,325 B1 | 10/2002 | Leemhuis | |
| 6,507,825 B2 | 1/2003 | Suh | |
| 6,510,419 B1 * | 1/2003 | Gatto | 705/36 R |
| 6,519,571 B1 | 2/2003 | Guheen et al. | |
| 6,671,674 B1 | 12/2003 | Anderson et al. | |

(Continued)

FOREIGN PATENT DOCUMENTS

JP    2003/345971    5/2003

(Continued)

OTHER PUBLICATIONS

"Code of Practice for Enhanced Commissions Processing," Thomson Financial esg, OASYS, Sep. 28, 2000, pp. 1-69.

(Continued)

*Primary Examiner*—Jagdish N Patel
*Assistant Examiner*—Kevin Poe
(74) *Attorney, Agent, or Firm*—K&L Gates LLP

(57) ABSTRACT

Systems and methods for allocating limited resources of a securities research department to accounts of the department are disclosed. According to various embodiments, the system includes an account scoring module and a resource matching module. The account scoring module is for generating a score for each account, and the resource matching module is for matching the resources of the department to the accounts based on the scores for each account.

51 Claims, 6 Drawing Sheets

U.S. PATENT DOCUMENTS

| | | | |
|---|---|---|---|
| 6,681,211 B1* | 1/2004 | Gatto | 705/36 R |
| 6,968,317 B1* | 11/2005 | Wallace et al. | 705/36 R |
| 7,072,858 B1 | 7/2006 | Litzow et al. | |
| 7,171,471 B1* | 1/2007 | Nair | 709/226 |
| 2002/0016752 A1 | 2/2002 | Suh | |
| 2002/0035534 A1 | 3/2002 | Buist et al. | |
| 2002/0055901 A1 | 5/2002 | Gianakouros et al. | |
| 2002/0065758 A1 | 5/2002 | Henley | |
| 2002/0111890 A1 | 8/2002 | Sloan et al. | |
| 2002/0198815 A1 | 12/2002 | Greifeld et al. | |
| 2003/0083926 A1* | 5/2003 | Semret et al. | 705/10 |
| 2003/0101124 A1* | 5/2003 | Semret et al. | 705/37 |
| 2003/0144932 A1 | 7/2003 | Martin et al. | |
| 2003/0158807 A1 | 8/2003 | Takeshi | |
| 2003/0225666 A1 | 12/2003 | Murtaugh et al. | |
| 2003/0236721 A1 | 12/2003 | Plumer et al. | |
| 2004/0010592 A1* | 1/2004 | Carver et al. | 709/226 |
| 2004/0088206 A1* | 5/2004 | Thompson et al. | 705/7 |
| 2004/0111308 A1* | 6/2004 | Yakov | 705/8 |
| 2004/0138998 A1 | 7/2004 | Lawrence | |
| 2004/0181378 A1* | 9/2004 | Gilmore | 703/6 |
| 2005/0096950 A1* | 5/2005 | Caplan et al. | 705/7 |
| 2005/0097028 A1* | 5/2005 | Watanabe et al. | 705/37 |
| 2005/0125274 A1* | 6/2005 | Nastacio et al. | 705/8 |
| 2005/0172083 A1* | 8/2005 | Meiri | 711/151 |
| 2005/0216323 A1* | 9/2005 | Weild | 705/7 |
| 2005/0240456 A1* | 10/2005 | Ward et al. | 705/7 |
| 2005/0246264 A1 | 11/2005 | Plunkett | |
| 2005/0261922 A1 | 11/2005 | Marchisotto et al. | |
| 2005/0261999 A1 | 11/2005 | Rowady, Jr. | |
| 2005/0278240 A1* | 12/2005 | Delenda | 705/37 |
| 2006/0167703 A1* | 7/2006 | Yakov | 705/1 |
| 2007/0264986 A1* | 11/2007 | Warrillow et al. | 455/414.3 |
| 2008/0021805 A1 | 1/2008 | Hansen et al. | |

FOREIGN PATENT DOCUMENTS

| | | |
|---|---|---|
| JP | 2003/288469 | 10/2003 |

OTHER PUBLICATIONS

Levitt, A., "Speech by SEC Chairman: Remarks before the 2000 Annual Meeting Securities Industry Association," US Securities and Exchange Commission, Boca Raton, Florida, Nov. 9, 2000.

Brennan et al., "Brokerage Commission Schedules," The Journal of Finance, vol. 48, No. 4, Sep. 1993, pp. 1379-1402.

Boni, L. et al., "Solving the Sell-Side Research Problem: Insights from Buy-Side Professionals," working paper, University of New Mexico, Aug. 8, 2002.

McCafferty, J., "Reform of sell-side research is creating a variety of new headaches for corporations," CFO Magazine, May 1, 2003.

"Bracing for Disclosure of Soft Dollars," Wall Street & Technology, Aug. 27, 2004.

Myner, "Institutional Investment in the United Kingdom: A Review," Mar. 6, 2001 ("The Myner's Report").

U.S. Dept. of Energy, "Activity Based Costing," Cost Estimating Guide, Chap. 24, Mar. 1997.

Roztocki et al., "An Integrated Activity-Based Costing and Economic Value Added System As An Engineering Management Tool for Manufacturers," 1998 ASEM National Conference Proceedings, Virginia Beach, Oct. 1-3, 1998, pp. 77-84.

Granof et al., "Using Activity-Based Costing to Manage More Effectively," PriceWaterhouseCoopers Report, Jan. 2000.

"2004 US Equity Research Industry Outlook—Table of Contents", Integrity Research Associates (3 pages).

"The Commission System", Treatise, Broker-Dealer-Law-and-Regulation, Section 10.02 The Commission System, 2008 (10 pages).

Anonymous, "Sell-Side Story", Prweek (U.S. ed.), New York, Jul. 7, 2003, p. 17 (5 pages), vol. 6, Issue 26.

Boni, Leslie et al., "Wall Street Research: Will New Rules Change Its Usefulness?", Financial Analysts Journal, May/Jun. 2003 (7 pages), vol. 59, Issue 3, ABI/INFORM Global.

Thomson, "Best Practices Report: The Broker Voting Process, Commentary and Analysis", Thomson Extel Surveys, Feb. 2008 (5 pages).

Business Editors/High-Tech Writers, "Independent Research Group Builds Equity Research Team", Business Wire, New York, Mar. 13, 2003, p. 1 (5 pages).

Chapman, P., "Keeping a Score for Traders: A Database That Keeps Track of Customer Business", Traders Magazine, New York, Dec. 1, 2003, p. 1 (3 pages).

Chen, Z., "Buy-Side and Sell-Side: The Industrial Organization of Information Production in the Securities Industry", University of Pennsylvania—The Wharton School, Mar. 2004, pp. 1-64.

"Equity Research Outlays Projected to Nearly Double in Next Five Years", PR Newswire, New York, Jun. 21, 2004, p. 1 (2 pages).

"Buy-Side Still Values Sell-Side Research, Study Says", FinanceTech, Mar. 26, 2008 (2 pages).

"Facing the Charges for Research: The Way Fund Managers Bill Their Clients Needs Reform: [London 1st Edition]", Financial Times, London (UK), Oct. 13, 2003, p. 20 (3 pages).

"The Future of Equity Research: Where Will the Investment Community Look?", PR Newswire, New York, Feb. 4, 2004, pg. (2 pages).

"National Express Group PLC Analyst and Investor Seminar": May 7, 2004, p. 1.

"Prudential Financial to Host Analyst and Investor Conference in Tokyo", Sep. 23, 2004, Business Wire, Jan. 23, 2004.

"An Interview with Mark Coker, Founder of Best Calls", 2000, 4 pages.

"Analyst Meeting", Dell Inc., Austin, Texas, Apr. 8, 2004, 55 pages.

"International Managers Feel Pinch of Sellside's Cost-Cutting Moves", Fund Action, New York, Jun. 30, 2003, p. 1 (2 pages).

Friedlander, J., "Independents to Gobble Research Pie in Future Study says Industry to Nearly Triple, Taking Money from Big Street Firms", The Investment Dealers' Digest: IDD, New York, Jul. 5, 2004, p. 1 (2 pages).

Nocera, J., "Wall Street on the Run", Fortune, New York, Jun. 14, 2004, vol. 149, Issue 12, p. 107 (6 pages).

Leone, M., "The Flight of the Sell-Side Aalyst", CFO.com, Boston, Jul. 8, 2004, p. 1 (2 pages).

McCafferty, J., "Reform of Sell-Side Research is Creating a Variety of New Headaches for Corporations," CFO Magazine, May 1, 2003.

Mehta, N., "Sellside Research Must Try Harder: Rocked by Scandals, Institutional Sellside Research Will Never be the Same", Traders agazine, New York, Dec. 1, 2003, p. 1 (6 pages).

Milhench, C., "Global Brokers Survey: Rethinking the Research Model", Global Investor, London, Sep. 2004, p. 1 (29 pages).

Krantz, M., "Research for Individuals Can Cost a Bundle", USA Today, Dec. 2, 2002 (3 pages), accessed May 14, 2008, 3:51 PM from http://www.usatoday.com/money/industries/brokerage/2002-11-27-resea....

Munk, C. Winokur, "Analysts' Roles Evolve with Incentives", Wall Street Journal (Eastern Edition), New York, May 21, 2003, p. 1 (4 pages).

Chapman, P., "Rating Sellside Services: Software Made for Buyside Spendthrifts", Traders Magazine, New York, May 1, 2004, p. 1 (3 pages).

Sec-Rel, Sec-Docket 79 Sec-Docket 2540-113, "United States of America Before the Securities and Exchange Commission", Release No. ID-225, Administrative Proceeding File No. 3-10607, Mar. 19, 2003 (13 pages).

"Sell-Side Analysts Heading to the Buy Side", Real Estate Finance and Investment, New York, Nov. 3, 2003, p. 1 (2 pages).

Sisk, M., "The Best of the Buy Side—II Magazine Platinum", Institutional Investor, (International Edition), New York, Jun. 2003, p. 1 (6 pages).

Stock, H., "Most Buy Siders Use Sell-Side Reports for Tips, Despite Conflicts", Investor Relations Business, New York, May 12, 2003, p. 1 (4 pages).

Gullapalli, D., "Moving the Market—Tracking the Numbers/Street Sleuth: On Governance, Wall Street May Carry Big Stick; After a Report by Goldman, Companies Make Changes; Right Role for 'Sell Side'?", Wall Street Journal, (Eastern Edition), New York, Aug. 31, 2004, p. C.3 (2 pages).

"Eliot Spitzer on His Fund Blitzkrieg", Business Week (Online), New York, Sep. 18, 2003, p. 1 (3 pages).

"The October Revolution on Wall Street: Strategies for adapting to the changing research landscape," Coffin Communications Group, Jun. 2003.

Boni, et al., "Wall Street's Credibility Problem: Misaligned Incentives and Dubious Fixes?," 5th Annual Brookings-Wharton Conference on the Future of Securities Markets, Brookings-Wharton Papers on Financial Services, 2002.

Non-Final Office Action mailed Mar. 19, 2008 for U.S. Appl. No. 10/856,442.

Non-Final Office Action mailed Dec. 11, 2008 for U.S. Appl. No. 10/856,442.

Interview Summary mailed Mar. 17, 2009 for U.S. Appl. No. 10/856,442.

Non-Final Office Action mailed May 21, 2008 for U.S. Appl. No. 10/857,526.

Non-Final Office Action mailed Mar. 16, 2009 for U.S. Appl. No. 10/857,526.

Interview Summary mailed May 15, 2009 for U.S. Appl. No. 10/857,526.

Non-Final Office Action mailed Jan. 30, 2008 for U.S. Appl. No. 10/939,087.

Interview Summary mailed Apr. 11, 2008 for U.S. Appl. No. 10/939,087.

Interview Summary mailed May 16, 2008 for U.S. Appl. No. 10/939,087.

Non-Final Office Action mailed Sep. 17, 2008 for U.S. Appl. No. 10/939,087.

U.S. Appl. No. 10/856,442, filed May 28, 2004.

U.S. Appl. No. 10/857,526, filed May 28, 2004.

U.S. Appl. No. 10/939,087, filed Sep. 10, 2004.

U.S. Appl. No. 11/450,994, filed Jun. 12, 2006.

Tumolo, M., Business-to-Business Exchanges, Information Systems Management; Spring 2001, vol. 18, Issue 2, 25 pages.

Anonymous, "LA Based Credit Union Installs Harland's Touche Solution", May 2002, Bank Systems and Technology, V39N5, 2 pages.

Anonymous, "Business Objects Launches Ithena, Inc.: New Subsidiary Defines First E-Customer Intelligence Analytic Application" Feb. 9, 2000, Business Wire, 0006.

Interview Summary mailed Aug. 27, 2009 for U.S. Appl. No. 10/856,442.

Notice of Allowance mailed Oct. 6, 2009 for U.S. Appl. No. 10/857,526.

Mehta, N. "Sellside Research Must Try Harder: Rocked by Scandals, Institutional Sellside Research Will Never by the Same", Traders Magazine, New York, Dec. 1, 2003, p. 1 (6 pages).

Final Office Action mailed Aug. 4, 2009 for U.S. Appl. No. 10/856,442.

Notice of Allowance mailed Jul. 9, 2009 for U.S. Appl. No. 10/939,087.

* cited by examiner

| Step 1 - Set Scoring | Step 2 - Set Service Inventory | Step 3 - Optimize | Relationship Optimization |

Step 1: Select Inventory Scenario

Current [ ▼ ]

Step 2: Set Inventory Scenario

| Analyst | Relationship Cap |
|---|---|
| Analyst A | 20 |
| Analyst B | 107 |
| Analyst C | 98 |
| Analyst D | 11 |
| Analyst E | 125 |
| Analyst F | 10 |
| Analyst G | 139 |
| Analyst H | 177 |
| Analyst I | 54 |
| Analyst J | 77 |
| Analyst K | 18 |
| Analyst L | 198 |
| Analyst M | 127 |
| Analyst N | 96 |
| Analyst O | 51 |
| Analyst P | 35 |
| Analyst Q | 37 |

Record: 1 of 108

*FIG. 6*

MATCHING RESOURCES OF A SECURITIES RESEARCH DEPARTMENT TO ACCOUNTS OF THE DEPARTMENT

BACKGROUND

1. Field of the Invention

The present invention generally concerns techniques for matching resources of a sell-side securities research department to clients (or accounts) of the securities research department.

2. Background of the Invention

In the securities research industry, so called "sell-side firms" provide, among other things, research regarding securities (such as stocks or bonds) to so-called "buy-side firms," i.e., institutional investors such as mutual funds, hedge funds, pension funds, etc. Historically, analysts of the sell-side firm largely determined the amount of service a particular client buy-side firm received from the sell-side firm. The analysts were typically given some guidance as to which clients were more important relative to others (such as in terms of profitability to the sell-side firm) in the assumption that more service resources would be allocated to those clients, but often the service levels were driven by other considerations, such as the ranking of the analyst. This often resulted in an inefficient allocation of resources by the research department. Accordingly, there exists a need for techniques to optimize the allocations of resources of a securities research department.

SUMMARY

In one general aspect, the present invention is directed to a system for allocating limited resources of a securities research department to accounts of the department. According to various embodiments, the system includes an account scoring module and a resource matching module. The account scoring module is for generating a score for each account, and the resource matching module is for matching the resources of the department to the accounts based on the scores for each account. The system may also include a forecasting module for estimating the financial (or economic) impact to the research department of making various resource allocations.

In various implementations, the resources of the securities research department to be matched to the accounts are analyst-contact relationships. The score is a way to represent the value of the account relative to other accounts based on attributes and the attributes' relative importance in being relevant in determining the account's value to the securities research department. The score of an account may be based on a hierarchical tree of categories and attributes. The account's score may be based on a weighted percentage average of the account's score in the categories. The account's score for each category may be based on a weighted percentage average of the account's ranking for each attribute related to the particular category. The attribute rankings may be, for example, percentile rankings.

The resource matching module may match the resources of the department to the accounts based on the scores for each account. The inventory (or available capacity) for each resource in input into the system. The resource matching module may match the resources of the department to the accounts by (i) distributing a number of points to each account based on the score of the account as determined by the account scoring module; (ii) spreading the points of each account across the resources of the firm that are of interest to the particular accounts; and (iii) matching the resources to the accounts based on the number of points allocated to the resource for each account. When a particular account has points allocated to a resource for which there is no remaining inventory, the points of the account allocated to that resource may be distributed to other resources of interest to the account for which there is remaining inventory.

In another general aspect, the present invention is direct to a method for allocating limited resources of a securities research department to accounts of the department. According to various embodiments, the method may include generating a score for each account, and matching the resources of the department (such as analyst-contact relationships, one-to-one meetings, conference attendance, corporate events, etc.) to the accounts based on the scores for each account.

FIGURES

Various embodiments of the present invention are described herein by way of example with reference to the following figures, wherein:

FIGS. 5 and 6 illustrate screen shots generated by the user interface according to various embodiments of the present invention.

DESCRIPTION

Figure 1:
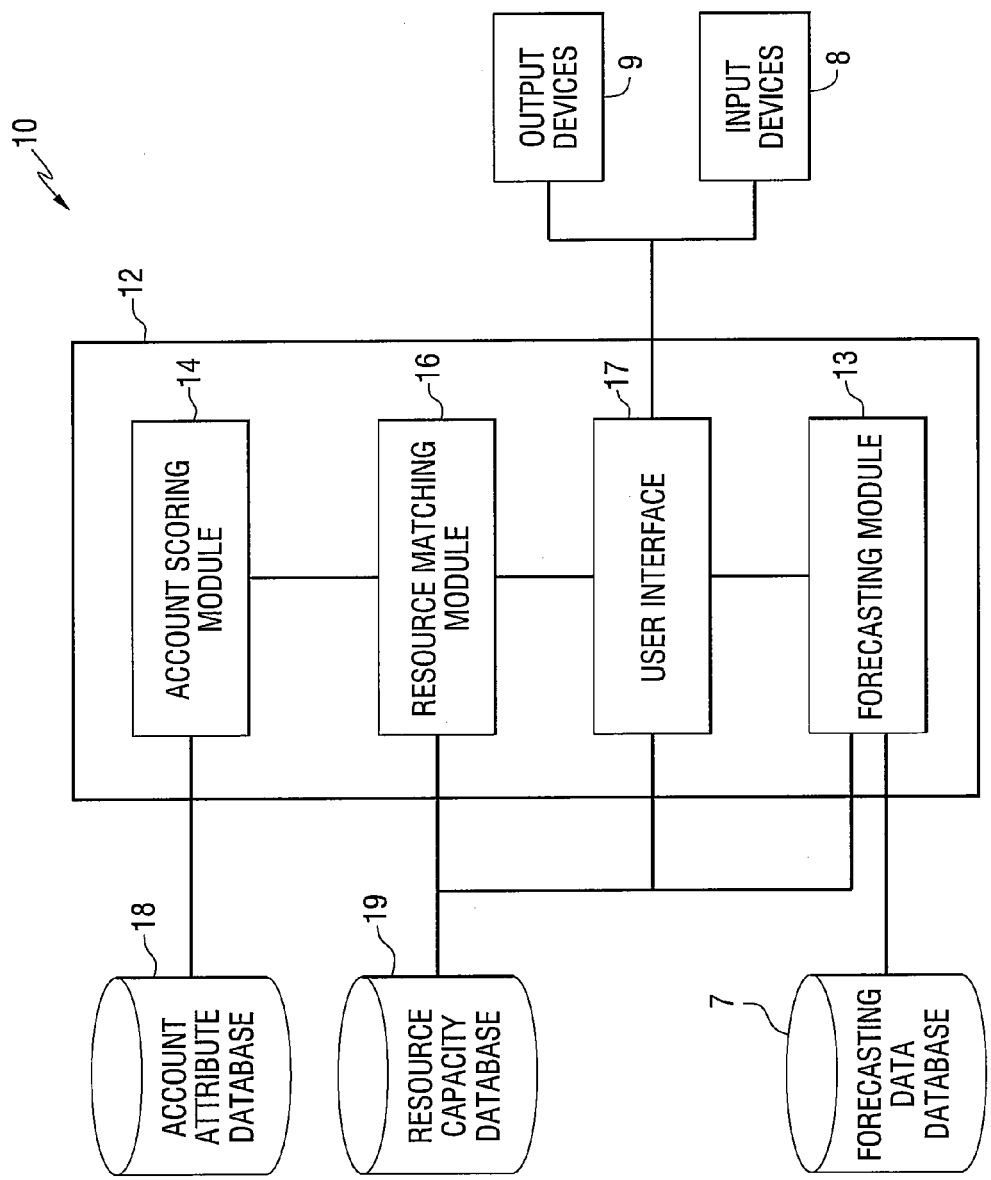
FIG. 1 is a diagram of a system according to various embodiments of the present invention.

FIG. 1 is a diagram of a system 10 according to various embodiments of the present invention. The system 10 may be used for matching scarce or limited resources of a supplier of securities research (e.g., equities and/or debt securities research) to consumers of the research. For purposes of the description to follow, the supplier of the securities research is sometimes referred to as a "sell-side firm" or as the "securities research department." The sell-side firm may be, for example, a brokerage or investment house, or an independent research firm. The consumer of the securities research may be an institutional investor, such as a pension fund, a mutual fund, or a hedge fund, or any other type of buy-side firm. The consumer of securities research is sometimes referred to herein as a "client" or "account" of the sell-side firm supplying the securities research, or as a "buy-side firm."

According to various embodiments, the system 10 includes a computing device 12 comprising a number of modules. For example, as illustrated in FIG. 1, the computing device 12 may include an account scoring module 14, a resource matching module 16, a forecasting module 13, and a user interface 17. The modules 13, 14, 16, 17 may be implemented as software code to be executed by a processor (not shown) of the computing device 12 using any suitable computer language, such as, for example, Java, C, C++, or Perl, etc., using, for example, conventional or object-oriented techniques. The software code may be stored as a series of instructions or commands on a computer-readable medium, such as a random access memory (RAM), a read-only memory (ROM), a magnetic medium such as a hard drive or a floppy disk, or an optical medium, such as a CD-ROM. The computing device 12 may be implemented as one or a number of networked computing devices, such as personal computers, laptops, workstations, servers, etc.

The account scoring module 14 may generate a score (the "service score") for accounts of the securities research department based on one or more attributes. The service scores may be used, for example, to rank the value of an account to the sell-side firm relative to other accounts that do business with the sell-side firm. The scores, according to various embodiments, may consist of the weighted average percentiles that each account scores in each of the attributes that are included in computing the score and the relative weights of each attribute and category (e.g., cluster of attributes). Attributes can be, for example, quantitative or qualitative factors, but each factor is preferably translated to a quantitative form. For example, a qualitative factor may be translated using a scale of 1 to 100 to assess how much the account exhibits the particular factor with 1 being very little and 100 being very much. The account attribute data may be stored in an account attribute database 18.

The resource matching module 16 may, according to various embodiments, distribute an arbitrary number (such as 100,000, for example) of points ("preference points") to the accounts based on the service scores of the respective accounts, as determined by the account scoring module 14. Accounts may receive preference points in direct proportion to their share of all service score points given to accounts by the account scoring module 14, as described in more detail below. A percentage of the total preference points for each account may then be allocated to specific resources of the securities research department as a bid or other quantitative indication of interest by the account for that resource. The resource matching module 16 may then match the resources of the securities research department to the accounts based on the bids, as described further below. The inventory of resources may be stored in a resource capacity database 19.

The user interface 17, as described in more detail below, may allow a user of the system 10, via input devices 8 (such as a keyboard or mouse) and output devices 9 (such as a display monitor) to, for example, set the weightings of the attributes and categories of the scoring scenario, define the resource inventory (e.g., analyst-contact relationships), project revenues from accounts based on the results of the resource matching module 16, etc.

The forecasting module 13 may allow the user of the system to estimate the economic impact to the research department based on various resource allocation decisions, as described in more detail below.

Figure 2:
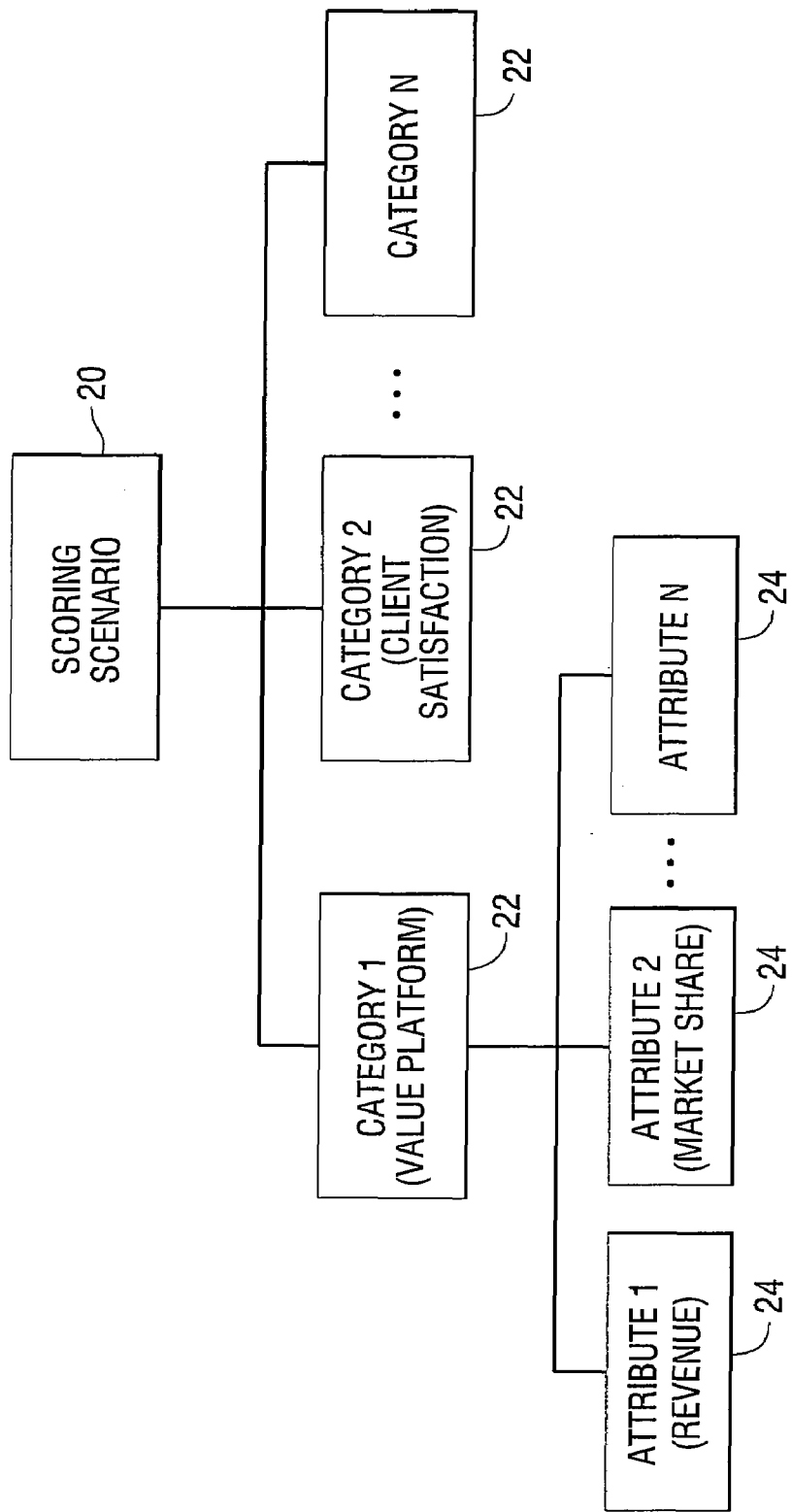
FIG. 2 is a diagram of a scoring scenario according to various embodiments of the present invention.

FIG. 2 is a diagram of a scoring scenario for the account scoring module 14 according to various embodiments of the present invention. As can be seen in FIG. 2, the scoring scenario may be represented as a hierarchical tree. The scoring scenario 20 may include at least one category 22. The number of categories 22 may be determined by the user of the system, e.g., managers or other persons associated with the department. Each category 22 may be weighted as a percentage of how important the category is in determining the value of accounts to the user (i.e., firm). The sum of all category weightings preferably equals 100%. Examples of categories include value platform, client satisfaction, profitability of the account for the sell-side firm, potential of the account, the broker vote, etc. The "broker vote" is a voting survey among large institutional investors in which the institutional investors rank the analysts from various research firms in different market sectors.

Each category 22 may comprise one or more attributes 24. Each attribute 24 may also be weighted as a percentage of how important the attribute is in determining the value of accounts to the user. The sum of all attribute weightings in a category preferably equals 100%. For a value platform category, for example, the attributes may include revenue to the sell-side firm from the account, market share of the sell-side firm for that account, etc. A research department's market share may be determined or estimated by third parties, such as McLagan Partners which tally trading slips.

If information for a particular account in an attribute or category is unavailable, the account scoring module 14 may score the accounts in such a way that the lack of information does not help or hurt the account's overall score, for example. To do so, when calculating an account's overall score, the account scoring module 14 preferably uses the attributes and categories where data is available, and normalizes them by dividing each available attribute or category weight by the sum of all available attribute or category weights. For example, assume a category has three attributes with the following percentage weightings:

| Attribute 1 | 80% |
|---|---|
| Attribute 2 | 10% |
| Attribute 3 | 10% |

If data were only available for Attributes 1 and 2, these attributes would then be weighted as 88.9% for Attribute 1 (computed as 80%/(80%+10%)) and 11.1% for Attribute 2 (computed as 10%/(80%+10%)). Similarly, if a scoring scenario had three categories weighted 50%-30%-20%, and data were only available for the 50% and 30% categories, the two categories for which data were available may be weighted as 62.5% and 37.5%, respectively.

The account scoring module 14, as mentioned above, may generate a service score for the accounts based on a weighted average percentile of each account's score for each attribute and category. For example, with reference to the scoring scenario of FIG. 2, a particular account may be assigned a percentile score for each attribute/category in the scoring scenario. An account's percentile for an attribute/category may be computed as:

$$\text{percentile} = \text{Integer}\left(\frac{\text{Rank} - 1}{\text{AccountCount}/100} + 1\right)$$

where Rank is the account's rank for the particular attribute/category and AccountCount is the number of the account in the ranking. For example, if an account's rank for a particular attribute/category is $34^{th}$ out of 500 accounts, the percentile for the account would be seven (7). The account scoring module 14 may compute the percentile based on available data or retrieve the percentile for each attribute/category for each account from the account attribute database 18. According to other embodiments, rather than evenly spreading the percentile rankings of the accounts across the scoring range, the rankings of the accounts may reflect the relative value of the account for that attribute/category. For example, if the attribute is revenue to the firm and there are one hundred accounts, and the revenue for one particular is account is twice the revenue of any of the other ninety-nine accounts, that account would receive a score of one-hundred and all of the other accounts would have a score of fifty or less, rather than giving the account that is second in revenue a score of ninety-nine despite the fact that its revenue is half the revenue of the top account.

The resource capacity database 19 may list the resources of the securities research department that need to be allocated to the accounts, as well as the available capacity (e.g., inventory) for each resource. For example, if the resource is analyst-contact relationships, then the database 19 may store the specific analysts of the securities research department that are available for accounts and the total number of relationships that each analyst can maintain at a given time with contacts for the various accounts of the research department (e.g., 50 analyst-contact relationships for an analyst). Each resource element can have its own capacity limit. For example, one analyst may be able to maintain fifty relationships, while another may be able to maintain seventy, etc., depending on the experience and capabilities of the analyst.

Figure 3:
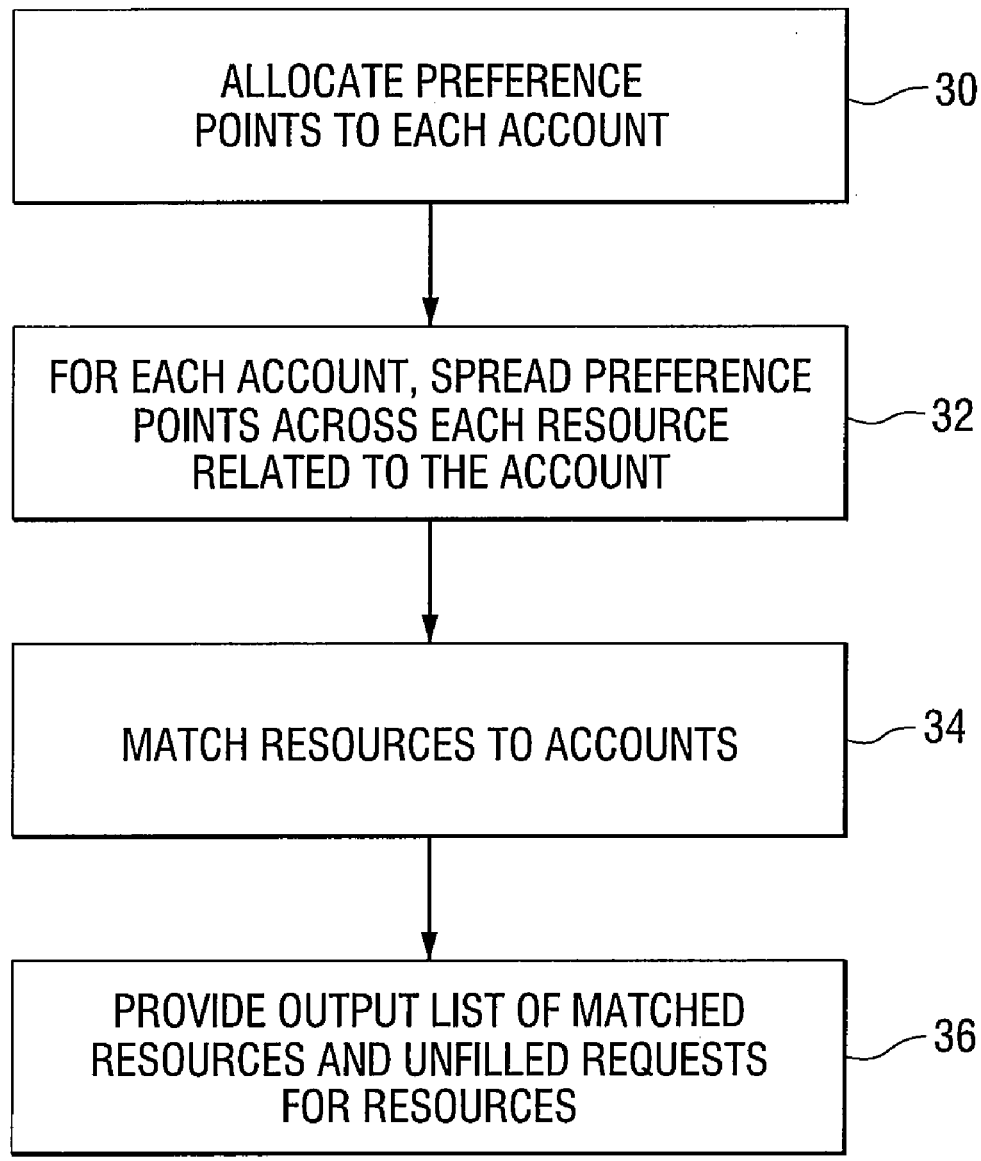
FIGS. 3-4 illustrate process flows of the resource matching module according to various embodiments of the present invention.

FIG. 3 is a diagram of the process flow of the resource matching module 16 according to various embodiments of the present invention. At step 30, the resource matching module 16 may distribute a predetermined, arbitrary number of preference points (e.g., 100,000 preference points) across each account for bidding on resources of the securities research department of interest to the particular account. The resource matching module 16 may distribute the preference points among the various accounts based on the respective service scores of the accounts, as determined by the account scoring module 14. The accounts may receive points in direct proportion to their share of all service score points. For example, the resource matching module 16 may determine the number of preference points to be awarded to a particular account according to the following calculation:

$$\text{Preference } Points_i = \frac{100{,}000 \times \text{Service } Score_i}{\sum_{n=1}^{N} ServiceScore_n}$$

where Preference Points$_i$ is the amount of preference points awarded to account i, Service Score i is the service score for account i, there are N accounts, and 100,000 preference points are used.

Next, at step 32, the preference points for each account are spread across the resources to be matched for the account. For example, if the resources to be matched are analyst-contact relationships, each analyst may have a Point Price indicative of the value of a relationship with the particular analyst for each account. The preference points for each account may be spread across the analysts according to following calculation:

$$\textit{Pref} \text{ Points per Analyst-Contact Relationship} = \frac{\textit{Pref} \text{ Points} * \text{Point Price for Analyst-Contact Relationship}}{\text{Sum of all Point Prices for all Relationships Related to Account}}.$$

A default table of point prices can be used to populate the accounts' initial bids for analyst-contact relationships. Users are preferably able to make changes to the default table values to reflect their knowledge of an account's actual preferences. An analysts point price may depend upon the analyst's popularity and the importance of the industry sector covered by the analyst.

Figure 4:
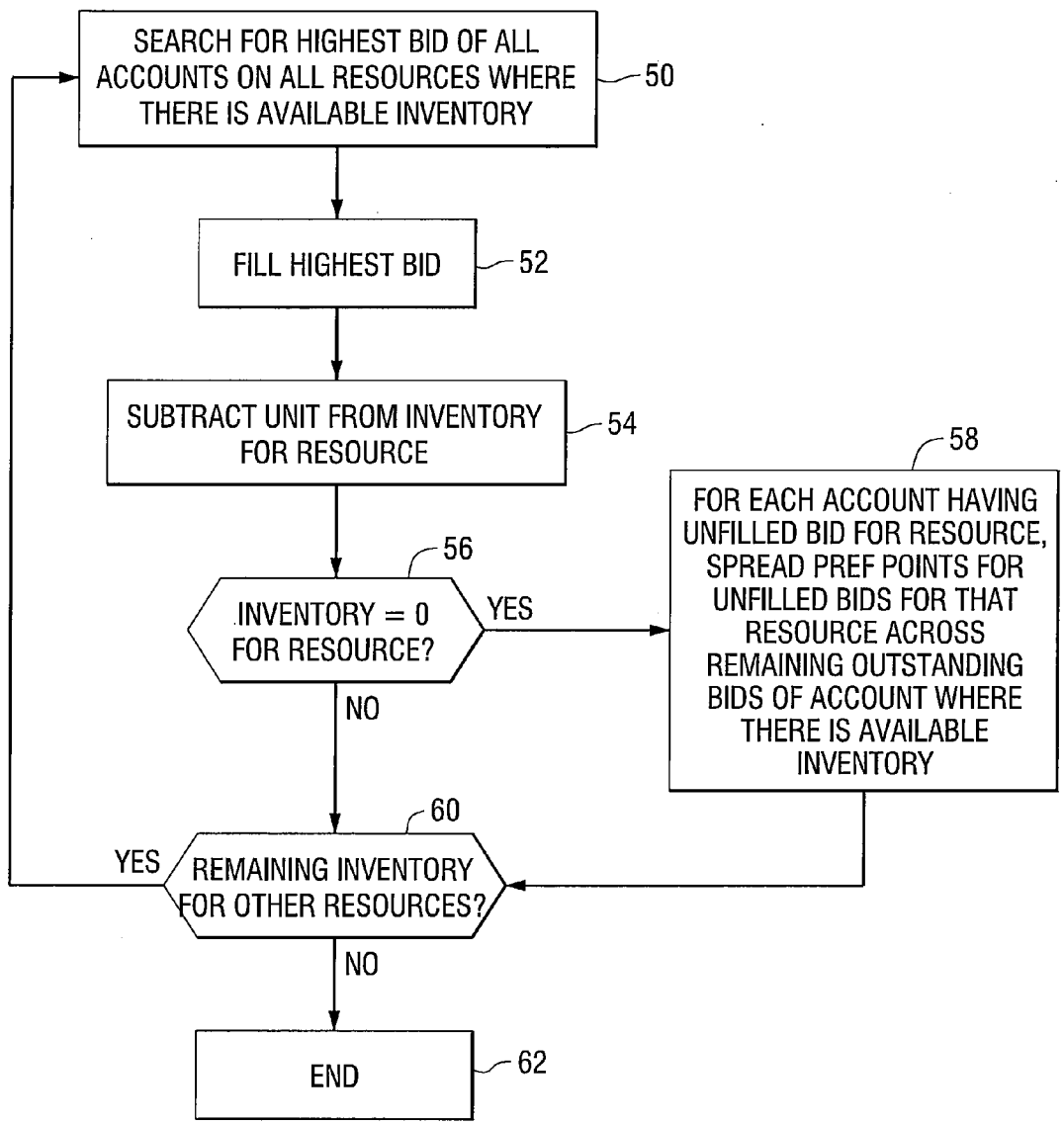

Next, at step 34, the resource matching module 16 may match the resources to the various accounts. The resource matching module 16 may perform the matching process of step 34 according to the process flow of FIG. 4 according to various embodiments of the present invention. Referring to FIG. 4, at step 50, the resource matching module 16 may search for the highest bid for all of the accounts on all of the resources where there is available inventory (e.g., analyst-contact relationships). At step 52, the resource matching module 16 may fill the highest bid and, at step 54, subtract the unit corresponding to the filled bid from the available inventory for that resource. For example, if Account A has a bid of X for an analyst-contact relationship with Analyst Y, and X is the highest bid on all available resources, then Account A's bid for the analyst-contact relationship with Analyst Y would be filled, and the number of available analyst-contact relationships for Analyst Y would be reduced by one.

Next, at step 56, the resource matching module 16 may determine if there is available remaining inventory for the resource. That is, the resource matching module 16 may determine if the decrement at step 54 reduced the available inventory for the particular resource to zero. If there is no more available inventory for the resource, the process may advance to step 58, where the resource matching module 16, for each account having unfilled bids for the unavailable resource, may spread the preference points for the unfilled bids across remaining outstanding bids of the account where there is available inventory. According to various embodiments, the preference points for the unfilled bids for the unavailable resource may be spread across the outstanding bids of the account in proportion to the account's outstanding preference point bids for resources.

Next, at step 60, the resource matching module 16 may determine if there is remaining inventory for any of the resources. If so, the process may return to step 50, where the process of matching bids to available resources may be repeated until there is no remaining inventory for each of the resources. When no inventory remains, or there are no unfulfilled bids (which is unlikely), the process may end at step 62.

Returning to FIG. 3, following the matching of the resources to the accounts at step 34, the process flow of the resource matching module 16 may advance to step 36, where the resource matching module 16 may provide an output list of matched resources to each account (i.e., list of filled orders) as well as a list of unfilled requests for resources.

Returning to FIG. 1, the user interface 17 may, for example, allow the user of the system 10 to establish the criteria for the scoring scenario. The user interface 17 may display a number of screens for the user on a monitor that the user may complete to, for example, define the scoring scenario(s), define the inventory, specify the resources that are important to a particular account, etc. The user may interact with the user interface 17 via input and output devices 8, 9 locally connected to the system 10 or remotely connected to the system via, for example, a data network such as a LAN.

Figure 5:
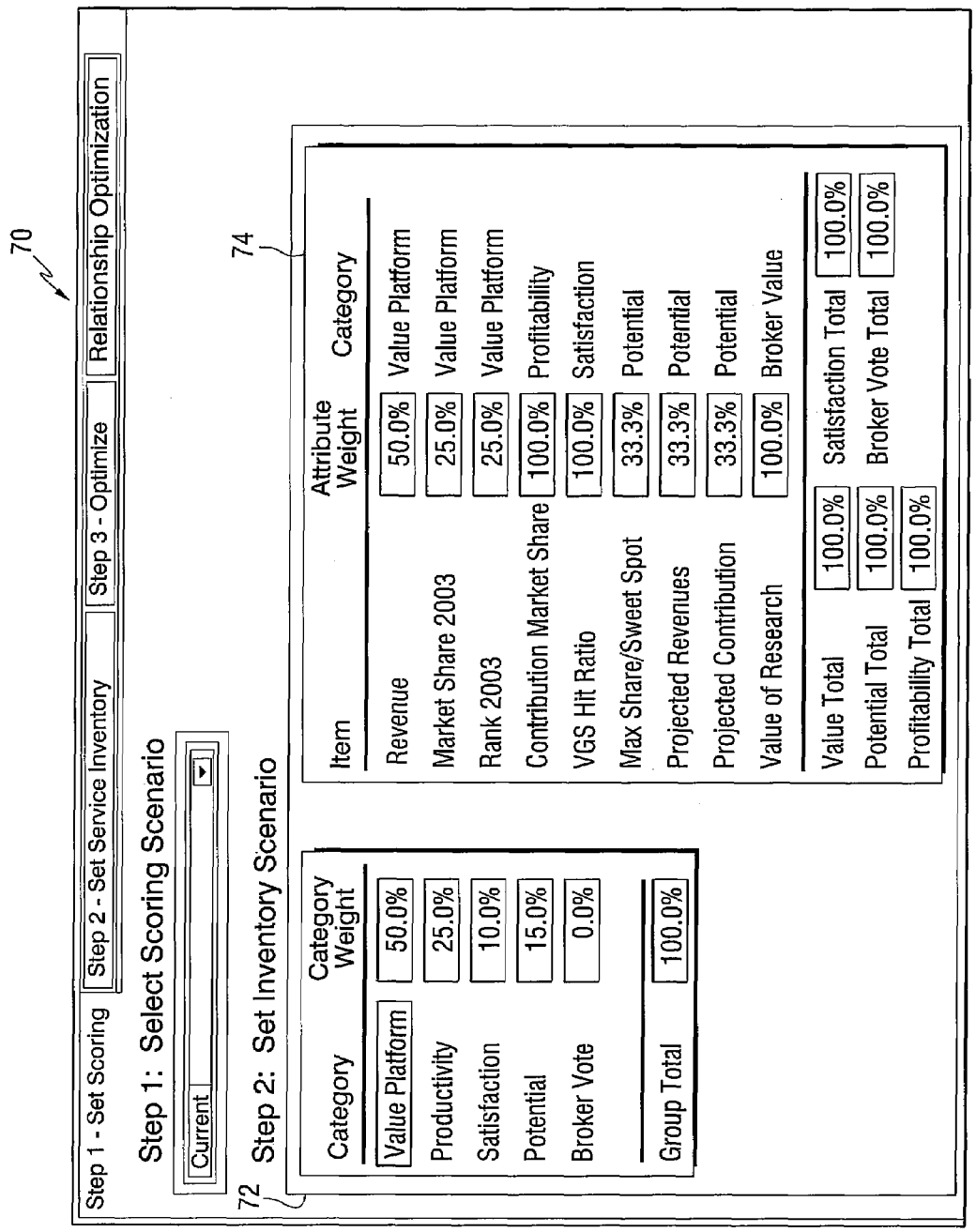

FIG. 5 is a screen shot 70 that the user interface 17 may provide to the user through which the user may define the scoring scenario according to various embodiments. In field 72, for example, the user may name the scoring scenario. In field 74, the user may specify the categories of the scoring scenario (see FIG. 2) and specify the percentage weights for each category. In field 76, the user may specify the attributes for each category and the percentage weights for each attribute. In the illustrated example, the sum of the percentage weights for each category equals 100%, as does the sum of the percentage weights for each attribute for each of the categories.

FIG. 6 is a screen shot 80 that the user interface 17 may provide to the user through which the use may define the inventory levels of the resources to be allocated. For an application where the resources are analyst-contact relationships, in field 82 the user may specify the different analysts and the total number of relationships that each analyst can maintain at a given time.

In a similar way, the user interface 17 may also provide the user with an opportunity to review the list of assignments and unfilled bids, and make changes to the list for various reasons, such as correcting perceived inequities in the assignments. Also, the system 10 may allow the user to create and save various scenarios, such as for different scoring scenarios, inventory capacities and account preferences.

The forecasting module 13 may be in communication with a forecasting data database 7 and allow a user of the system to estimate the economic impact of various resource allocation decisions. For example, based on data stored in the database 7 regarding the cost of certain analyst-contact relationships, the user may determine the cost of increasing or decreasing the number of relationships allocated to a particular client. Based on knowledge about how such changes would affect the market share of the sell-side firm of the client's total street spend, the benefit of increasing or decreasing the relationships could be evaluated.

While several embodiments of the invention have been described, it should be apparent, however, that various modifications, alterations and adaptations to those embodiments may occur to persons skilled in the art with the attainment of some or all of the advantages of the present invention. For example, various steps in the processes described herein may be performed in alternative orders. Also, although the various embodiments described above have been described in the context of a securities research department, the system may be used by any entity or firm having limited resources and information about account preferences. It is therefore intended to cover all such modifications, alterations and adaptations without departing from the scope and spirit of the present invention as defined by the appended claims.

What is claimed is:

1. A system for allocating limited resources of a securities research entity to a plurality of accounts associated with the securities research entity, comprising a computing device comprising at least one processor and an operatively associated computer readable medium, wherein the computer readable medium comprises instructions thereon that, when executed by the at least one processor cause the computing device to:

generate, using the computing device in communication with an account attribute database, a service score for each of the plurality of accounts based on one or more attributes having associated attribute values, wherein each service score is data that indicates the value to the securities research entity of the corresponding account relative to the other accounts, and wherein the associated attribute values are retrieved from the account attribute database; and match using the computing device in communication with a resource capacity database, the resources of the securities research entity to the plurality of accounts based at least in part on the service scores for each account, wherein the match of the resources to the accounts comprises:

determining with the computing device a number of preference points assigned to each account of the plurality of accounts based on the service score of the account;

receiving resource capacity data from the resource capacity database, wherein the resource capacity data indicates a quantity of resources available to be matched;

for each of the plurality of accounts, allocating the preference points assigned to the account across one or more of the resources of the securities research entity described by the resource capacity data and related to the account; and matching the resources to the plurality of accounts based at least in part on the number of preference points allocated to the resource for each account.

2. The system of claim 1, wherein the computer readable medium further comprises instructions thereon that, when executed by the at least one processor, cause the computing device to estimate the financial impact of resource allocations.

3. The system of claim 1, wherein the one or more attributes are organized into one or more categories, and wherein the computer readable medium further comprises instructions thereon that, when executed by the at least one processor, cause the computing device to generate the service score for each account based on a weighted percentage average of values of the account for a plurality of the one or more attributes related to each category.

4. The system of claim 3, wherein the values for the attributes include percentile rankings.

5. The system of claim 4, wherein the resources include analyst-contact relationships.

6. The system of claim 1, wherein the computer readable medium further comprises instructions thereon that, when executed by the at least one processor, cause the computing device to implement user interface for allowing a user to define a scoring scenario by which the service scores of the accounts are determined.

7. The system of claim 6, wherein the user interface is further for allowing the user to define resources and the capacity for each resource.

8. The system of claim 1, wherein the resources of the securities research entity comprise attendance at a one-to-one meeting with a securities research analyst.

9. The system of claim 1, wherein the resources of the securities research entity comprise attendance at a securities research conference.

10. The system of claim 1, wherein the resources of the securities research entity comprise attendance at a corporate event hosted by the securities research entity.

11. The system of claim 1, wherein each attribute value for an account comprises a ranking of the account in the attribute relative to other accounts of the securities research entity.

12. The system of claim 11, wherein the ranking of the account is a percentile ranking.

13. The system of claim 12, wherein the ranking of the account reflects a value of the account in the attribute relative to the values of other accounts associated with the securities research entity in the attribute.

14. The system of claim 1, wherein allocating the preference points assigned to each of the plurality of accounts across one or more of the resources of the securities research entity comprises:

for each of the one or more resources and for each account, receiving data indicating a value of the resource to the account;

determining a number of preference points of the account to be assigned to the resource depending at least in part on the data indicating the value of the resource to the account.

15. The system of claim 14, wherein the data indicating a value of the resource to the account is a point price, and wherein the preference points from an account selected from the plurality of accounts are assigned to a resource selected from the plurality of resources of the securities research entity according to:

Preference Points per Resource=(Preference Points*Resource Point Price)/(Sum Of All Point Prices For All Resources Related To The Account);

wherein the Resource Point Price is indicative of a value of the resource.

16. The system of claim 1, wherein matching each of the resources to one of the plurality of accounts based on the number of preference points allocated to the resource for each account comprises, for each resource:
   identifying the account having the most preference points allocated to the resource;
   matching the resource to the account having the most preference points allocated to the resource.

17. The system of claim 16, wherein matching each of the resources to one of the plurality of accounts based on the number of preference points allocated to the resource for each account comprises further comprises:
   conditioned on all resources of the same type as the resource being matched and for all accounts having remaining preference points allocated to resources of the same type as the resource being matched, reallocating the preference points of the accounts to resources of different types.

18. A computer-implemented method for allocating limited resources of a securities research entity to a plurality of accounts of the securities research entity, comprising:
   generating for each account of the plurality of account data indicating a service score of the account, wherein the generating is performed with a computing device comprising at least one processor and an operatively associated computer readable medium, and wherein each service score indicates the value of the corresponding account to the securities research entity relative to other accounts; and
   with the computing device, matching the resources of the securities research entity to the plurality accounts based at least in part on the service scores for each account, wherein the matching comprises:
      determining a number of preference points assigned to each account of the plurality of accounts, wherein the number of preference points assigned to the account is based on the service score of the account;
      for each of the plurality of accounts, allocating the preference points assigned to the account across one or more of the resources of the securities research entity related to the account; and
      matching the resources to the plurality of accounts based at least in part on the number of preference points allocated to the resource for each account.

19. The method of claim 18, further comprising estimating with the computing device the financial impact of resource allocations.

20. The method of claim 18, wherein the resources include analyst-contact relationships.

21. The method of claim 18, wherein the step of generating includes generating the service score for each account based a ranking of the account for at least one category associated with the service score of the account.

22. The method of claim 21, wherein the step of generating includes generating the service score for each account based on a ranking of the account for at least one attribute associated with the at least one category.

23. The method of claim 22, wherein the rankings for the attributes include percentile rankings.

24. The method of claim 21, wherein the step of generating includes generating the service score for each account based on a weighted percentage average of values of the account for a plurality of attributes associated with the service score for the account.

25. The method of claim 24, wherein the attributes are organized into a plurality of categories, and wherein at least one of the categories is selected from the group consisting of value and client satisfaction.

26. The method of claim 24, wherein the step of generating includes generating the service score for each account based on a weighted percentage average of rankings of the account for the plurality of categories.

27. The method of claim 24, wherein the rankings for the attributes include percentile rankings.

28. The method of claim 25, wherein one of the categories includes value, and the attributes for the value category include at least one of revenue and market share.

29. The method of claim 18, wherein the step of matching further includes, when an account selected from the plurality of accounts has preference points allocated to a resource for which there is no remaining inventory, allocating the preference points of the account allocated to the resource to other resources related to the account for which there is remaining inventory.

30. A computer implemented method for allocating limited resources of a securities research entity to a plurality accounts associated with the securities research entity, comprising:
   generating for a first account selected from the plurality of accounts data indicating a service score of the first account based on scores of the first account for a plurality of categories, wherein the service score indicates the value to the securities research entity of the first account relative to the other accounts of the plurality of accounts, wherein the plurality of categories comprises at least one category selected from the group consisting of an account value, client satisfaction, account profitability, and broker vote, and wherein the generating is performed with a computing device comprising at least one processor and an operatively associated computer readable medium;
   repeating the generating for the remaining accounts of the plurality of accounts; and
   with the computing device, matching each of the resources of the securities research entity to one of the plurality of accounts based at least in part on the service scores for each account of the plurality of accounts, and wherein the computing device is in communication with a resource capacity database.

31. A computer-implemented system for facilitating the allocation of limited resources of a securities research entity to a plurality of accounts associated with the securities research entity, the system comprising a computing device comprising at least one processor and an operatively associated computer readable medium, wherein the computer readable medium comprises instructions thereon that, when executed by the at least one processor cause the computing device to:
   generate, using the computing device, a service score for each of the plurality of accounts based on one or more attributes having associated attribute values, wherein each service score is data that indicates the value to the securities research entity of the corresponding account relative to the other accounts of the plurality of accounts; and match, using the computing device, the limited resources of the securities research entity to the plurality of accounts based at least in part on the service score for each account of the plurality of accounts and on data that represent quantitative indications of interest by each account for resources of the securities research entity; and generate an output list of resources matched to each account.

32. The system of claim 31, wherein the resources of the securities research entity comprise attendance at a one-to-one meeting with a securities research analyst.

33. The system of claim 31, wherein the resources of the securities research entity comprise attendance at a securities research conference.

34. The system of claim 31, wherein the resources of securities research entity comprise attendance at a corporate event hosted by the securities research entity.

35. The system of claim 31, wherein each attribute value for an account comprises a ranking of the account in the attribute relative to other accounts of the securities research entity.

36. The system of claim 35, wherein the ranking of the account is a percentile ranking.

37. The system of claim 35, wherein the ranking of the account reflects a value of the account in the attribute relative to the values of other accounts associated with the securities research entity in the attribute.

38. The system of claim 31, wherein the generating the service score is performed by a scoring module of the computer device in communication with an account attribute database.

39. The system of claim 31, wherein the matching of the limited resources to the accounts is performed with a matching module of the computer device in communication with a resource capacity database.

40. The system of claim 31, wherein the matching of the limited resources to the accounts based on data that represent quantitative indications is performed in sequence based on a search for the highest indication of interest, a matching of the corresponding resource, and reduction in the available inventory for the corresponding resource.

41. The system of claim 40, wherein each account is associated with preference points and the system allocates the account's preference points across the resources to be matched.

42. The system of claim 40, wherein when the available inventory for a resource is reduced to zero, the preference points allocated to the resource are re-allocated to other resources.

43. The system of claim 31, wherein the data that represent the quantitative indications of interest are generated by the at least one processor based at least in part on a table including data values that representing the relative value of the resources to each account.

44. The system of claim 43, wherein the resources to be matched are analyst-contact relationships.

45. The system of claim 31, wherein the computer readable medium further comprises instructions thereon that, when executed by the at least one processor, cause the computing device to allocate a predetermined number of preference points across the accounts based on each account's service score, for each account allocate the account's preference points across the resources to be matched, and match the resources to the accounts.

46. The system of claim 45, wherein the allocation of the account's preference points across the resources to be matched is based at least in part on a table including data values that representing the relative value of the resources to the account.

47. The system of claim 45, wherein the computer readable medium further comprises instructions thereon that, when executed by the at least one processor, cause the computing device to search for the highest quantitative indication of interest for all of the accounts on all of the resources with available inventory, and match the resource corresponding to the highest indication of interest to the account.

48. The system of claim 45, wherein the computer readable medium further comprises instructions thereon that, when executed by the at least one processor, cause the computing device to repeat the search for the highest indication of interest, match of the corresponding resource and decrement of available inventory until there is no remaining inventory of resources.

49. The system of claim 45, wherein the computer readable medium further comprises instructions thereon that, when executed by the at least one processor, cause the computing device to determine if there is available inventory for the corresponding resource.

50. The system of claim 31, wherein each service score is generated as a weighted average of the one or more attribute values.

51. The system of claim 50, wherein each service score is generated as a weighted average of one or more categories, wherein each category is associated with at least one of the one or more attributes.

* * * * *